No. 740,004. PATENTED SEPT. 29, 1903.
R. A. GILLESPIE.
TUBE COUPLING.
APPLICATION FILED NOV. 20, 1901. RENEWED FEB. 14, 1903.
NO MODEL. 2 SHEETS—SHEET 1.
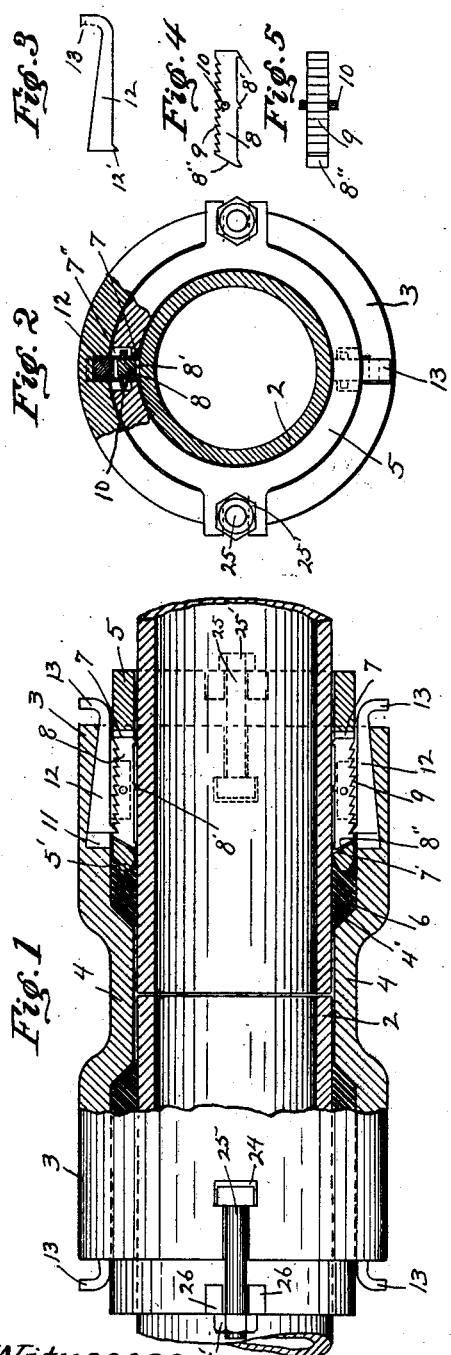
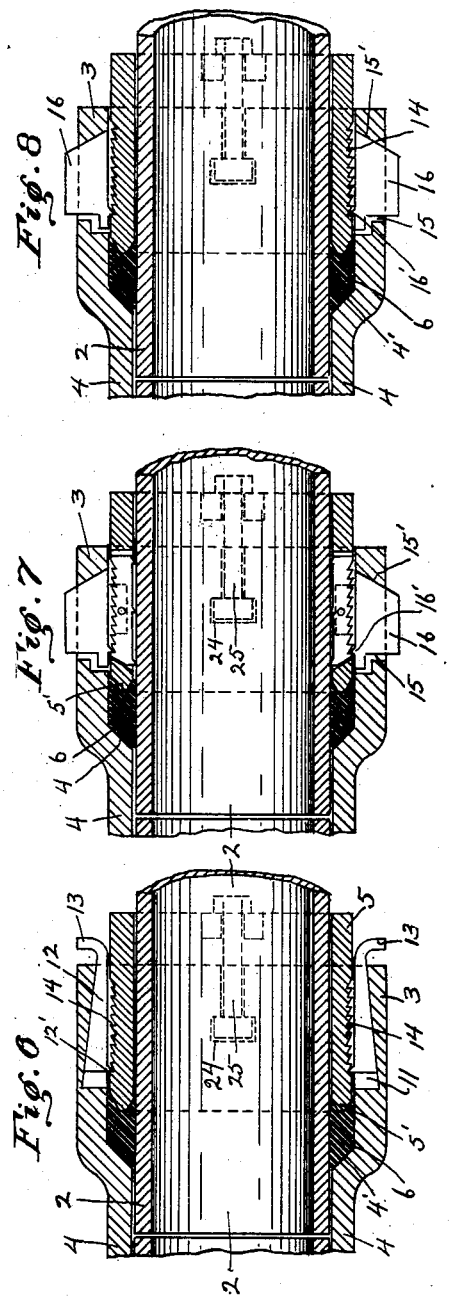

No. 740,004. PATENTED SEPT. 29, 1903.
R. A. GILLESPIE.
TUBE COUPLING.
APPLICATION FILED NOV. 20, 1901. RENEWED FEB. 14, 1903.
NO MODEL. 2 SHEETS—SHEET 2.
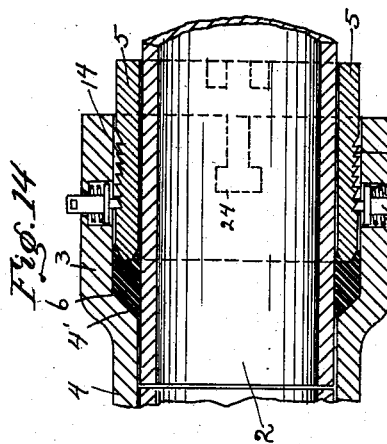
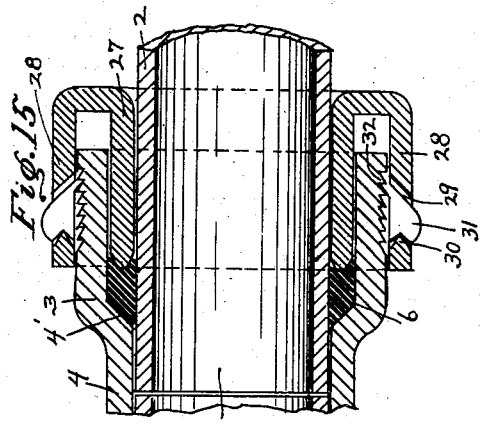
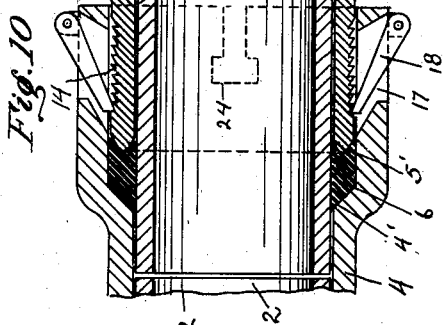
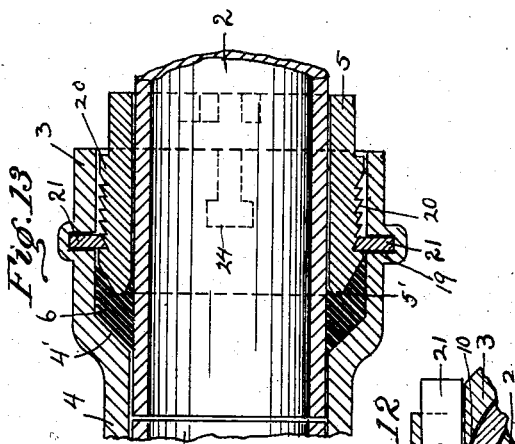
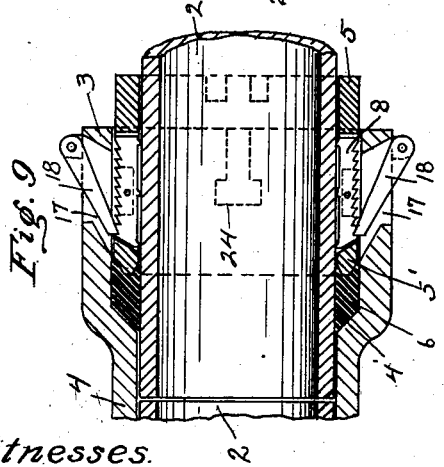
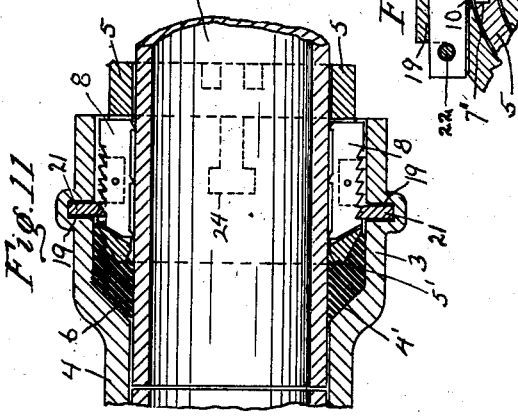
Witnesses.
Fred L. Sweet.
Alex. D. Mabou.
Inventor
R. A. Gillespie
By J. M. Karbit
Attorney.

No. 740,004. Patented September 29, 1903.

UNITED STATES PATENT OFFICE.

ROBERT A. GILLESPIE, OF ALLEGHENY, PENNSYLVANIA, ASSIGNOR TO THE GILLESPIE MANUFACTURING COMPANY, OF PITTSBURG, PENNSYLVANIA.

TUBE-COUPLING.

SPECIFICATION forming part of Letters Patent No. 740,004, dated September 29, 1903.

Application filed November 20, 1901. Renewed February 14, 1903. Serial No. 143,434. (No model.)

*To all whom it may concern:*

Be it known that I, ROBERT A. GILLESPIE, a citizen of the United States, residing at Allegheny, in the county of Allegheny and State of Pennsylvania, have invented certain new and useful Improvements in Tube-Couplings, of which the following is a specification, reference being had therein to the accompanying drawings.

This invention relates to couplings for smooth or unthreaded tubes and pipes wherein a gland is used for effecting a tight union, and one object is to provide improved adjustable connection between the gland and coupling-sleeve.

A further object is to provide means, actuated, preferably, by the gland-securing mechanism, for impinging the pipes and resisting longitudinal displacement thereof in the coupling-sleeve.

The invention consists in the novel features of construction and in the combination and arrangement of parts hereinafter fully described and claimed, and illustrated by the accompanying drawings, wherein—

Figure 1 is a view, partly in section and partly in elevation, of a coupling embodying my invention. Fig. 2 is an end view of the same, partly in section. Fig. 3 is a detail view of the gland-securing slip or wedge. Figs. 4 and 5 are similar views of the pipe-impinging dog. Figs. 6 to 15, inclusive, are sectional views of couplings of modified form.

Referring to the drawings, 2 designates the smooth unthreaded pipes or tubes, and 3 the coupling-sleeve contracted centrally at 4 to receive the pipe extremities and at the ends of sufficient diameter to admit the pipe-embracing glands 5. The inner edge of each gland is tapered at 5' to enter a groove of similar form in the outer edge of rubber packing-ring 6, while the inner edge of the latter is cut obliquely to engage the corresponding surface 4' of the sleeve contraction, whereby when the rubber is compressed by the gland the space between the pipe and sleeve is sealed in a most effective manner.

In the preferred embodiment of my invention the gland is formed with two or more slots or openings 7 to receive the pipe-gripping dogs 8, provided, preferably, with teeth 8' on their inner edges and on their outer edges with notches or serrations 9. These dogs are caused to forcibly impinge the pipe by the gland-securing means presently to be described, and the inner extremity of each dog and the inner end of slot 7 are correspondingly inclined or beveled at 8" and 7', respectively, whereby outward or backward pressure of the gland on the dogs tends to force the latter inward and more tightly grip the pipe. Each dog may be provided with side projections 10, extending into enlargements 7" of slots 7, whereby the dogs are retained in the gland, with the latter secured temporarily in the sleeve, as when shipping or storing the couplings.

For applying the coupling the glands may be secured in a variety of ways, either alone or in connection with the pipe-impinging dogs. In the construction shown in Figs. 1, 2, and 6 the inner face of each extremity of sleeve 3 is formed with the longitudinally-tapering depressions 11, which receive the correspondingly-formed slips or dogs 12, each having a tooth 12' and a projecting extremity 13, extending beyond the sleeve 3 to form a handhold. In Figs. 1 and 2 slip-teeth 12' engage the notched outer edges 9 of dogs 8, so that in any outward displacement of the gland there is a corresponding movement of the slips, which at the same time are moved toward the pipe, and thereby force dogs 8 more tightly in engagement therewith. This, in addition to the direct inwardly-forcing action of the gland on the dog, above described, provides a thoroughly-automatic lock, the effectiveness of which increases under an increasing strain, so that longitudinal displacement of the coupled pipes is absolutely impossible. For uses wherein it is deemed unnecessary to guard against longitudinal displacement the pipe-impinging dogs may be omitted, in which case the gland is notched at 14, where it is directly engaged, as in the construction of Fig. 6, by the toothed slips 12.

In Figs. 7 and 8 sleeve 3 is formed with through slots or openings 15, beveled at their outer ends at 15' to receive the beveled dogs 16, toothed at 16' to engage either pipe-gripping dog 8 or the gland-notches 14. In this arrangement an increasing outward pressure or strain augments the effectiveness of the coupling. Openings 15 are of such form as to prevent outward passage of dogs 16, so that the coupling parts may be assembled for shipping or storage without danger of loss.

In Figs. 9 and 10 sleeve 3 is slotted at 17 to receive the pivoted pawls 18, which engage either dogs 8 or gland-notches 14.

In Figs. 11, 12, and 13 the sleeve is formed with transverse openings 19, coincident with dogs 8 or the raised notched surfaces 20 of gland 5, and operating in said openings to engage either the dogs or gland-notches are the wedge-shaped keys 21, having beveled notch-engaging edges and apertured at their smaller ends to receive cotter-pins 22, which guard against accidental dislodgment of the keys. The latter being wedge shaped any desired amount of pressure may be exerted on the pipe-gripping dogs or glands.

In Fig. 14 the gland-notches 14 are shown engaged by the outwardly-movable spring-held bolts or latches 23, arranged in suitable openings 24 in sleeve 3.

For forcing the glands into the sleeves when applying the several forms of couplings thus far described sleeve 3 is formed with openings 24 to receive the headed clamp-bolts 25, which are readily slipped thereinto, with the bolts projecting outwardly between gland-lugs 26, where they receive the nuts 25′, and by this means any desired amount of pressure may be exerted on the glands and packing 6, and when sufficiently tight the locking means may be applied, all forms of the latter being readily manipulated, after which bolts 25 are removed. Said bolts may be applied at any time for the purpose of tightening or removing the coupling. While I prefer this form of clamp, it will be understood that clamps of various forms may be employed for forcing the glands into the sleeves.

In the construction of Fig. 15 a U-shaped gland 27 is employed which embraces sleeve 3 and has its outer branch or surface 28 formed with openings 29, provided with knife-edge seats 30 for dogs 31, the latter being confined on said seats and having limited movement in openings 29 for engaging notches 32 in the outer surface of sleeve 3.

From the several examples here shown it will be seen that the principles underlying my invention may be applied in a great variety of ways, any one of which provides ample range of adjustment and serves to secure the coupling in a most effective way.

With ground pipe-lines for various purposes, whether water, oil, gas, or other fluids or liquids, the corrosion is such that in a very short time threaded joints become so fixed that it is impossible to move them for adjustment or repair, and this, in addition to the expense of cutting threads, makes threaded couplings generally undesirable, and not only this, but also it is difficult to secure an absolutely tight joint where threads are used. All these objectionable features I have overcome, and at the same time the securing means are simple, effective, readily accessible, and not subject to serious injury from rust or corrosion, being within or inclosed by the coupling elements.

Having thus fully described my invention, what I claim as new, and desire to secure by Letters Patent, is—

1. In a coupling, the combination of a sleeve having side depressions or openings, packing, packing-securing means, and wedge-shaped securing devices for the latter in the sleeve depressions or openings.

2. In a coupling, the combination of a sleeve, packing, packing-compressing means, tube-impinging devices adapted to secure the said compressing means, and means for uniting the sleeve and the tube-impinging devices.

3. In a coupling, the combination of a sleeve, a gland, tube-impinging devices adapted to secure the gland, and means for uniting the sleeve and the tube-impinging devices.

4. In a coupling, the combination of a sleeve member, a pipe-securing member overlapping and adjustable longitudinally of the sleeve member, series of securing-points extending longitudinally of one of the members, and a securing device carried by the other member for adjustably engaging said securing-points.

5. In a coupling, the combination of a sleeve formed with side depressions or openings, a gland, and gland-securing devices in the sleeve depressions or openings.

6. In a coupling, the combination of a sleeve formed with side depressions or openings, a gland having longitudinally-extending series of securing-points coincident with said depressions or openings, and securing devices confined in the latter for engaging the securing-points.

7. In a coupling, the combination of a sleeve formed with side depressions or openings, a gland, and wedge-shaped gland-securing devices in said sleeve depressions or openings.

8. In a coupling, the combination of a sleeve, a gland formed with side openings, pipe-impinging devices in said openings, and gland-securing means.

9. In a coupling, the combination of a sleeve, a gland formed with side openings having beveled faces, pipe-impinging devices in the openings formed with beveled faces which are engaged by the corresponding faces of the gland-openings, and gland-securing means.

10. In a coupling, the combination of a sleeve, a gland having side openings, inwardly-movable pipe-impinging devices in the gland-opening, and gland-securing means operatively engaging said devices for forcing them inward.

11. In a coupling, the combination of a sleeve, a gland formed with side openings, pipe-impinging dogs in said openings having serrated outer faces, and gland-securing devices adapted to adjustably engage the serrated dogs.

12. In a coupling, the combination of a sleeve formed with tapered or wedge-shaped openings or depressions, a gland having side openings coincident with the sleeve-openings, pipe-impinging dogs in the gland-openings, and gland-securing devices adjustable longitudinally in the tapered sleeve-openings and adapted to engage and force inward the said dogs.

13. In a coupling, the combination of a sleeve formed with tapered or wedge-shaped depressions or openings, a gland having side openings, pipe-impinging dogs in the gland-openings, said openings and dogs having coöperating beveled faces acting to force the dogs inward against the pipe when the gland moves outward, and longitudinally-tapered or wedge-shaped gland-securing devices in the sleeve-openings and operatively engaging the pipe-impinging dogs.

14. In a coupling, the combination of a sleeve, a gland formed with side openings, pipe-impinging dogs having limited inward movement in said gland-openings, and gland-securing means.

15. In a coupling, the combination of a sleeve formed with side openings or depressions, a gland having side openings, pipe-impinging dogs having limited inward movement in the gland-openings, and gland-securing devices confined and having limited movement in the sleeve-openings.

In testimony whereof I affix my signature in presence of two witnesses.

ROBERT A. GILLESPIE.

Witnesses:
J. M. NESBIT,
MARGARET HUGHES.